United States Patent [19]

Udono

[11] 4,358,991
[45] Nov. 16, 1982

[54] HYDRAULIC BOOSTER

[75] Inventor: Jun Udono, Higashiyamato, Japan

[73] Assignee: Nissan Motor Co., Ltd., Yokohama, Japan

[21] Appl. No.: 112,527

[22] Filed: Jan. 16, 1980

[30] Foreign Application Priority Data

Jan. 17, 1979 [JP] Japan .................................. 54-4097

[51] Int. Cl.³ .............................................. F15B 9/10
[52] U.S. Cl. ...................................... 91/470; 91/368; 60/547 B
[58] Field of Search ........................ 91/368, 470, 422; 60/547 B

[56] References Cited

U.S. PATENT DOCUMENTS

| 1,734,368 | 11/1929 | Cumner | 91/470 |
|---|---|---|---|
| 1,864,530 | 6/1932 | Dormon | 91/470 |
| 3,292,499 | 12/1966 | Duffy | 91/368 |
| 3,452,543 | 7/1969 | Goff | 60/52 |
| 3,457,836 | 7/1969 | Henderson | 91/368 |
| 3,879,948 | 4/1975 | Flory | 60/548 |

FOREIGN PATENT DOCUMENTS

| 2001680 | 10/1971 | Fed. Rep. of Germany. |
|---|---|---|
| 2712920 | 12/1979 | Fed. Rep. of Germany. |
| 2168841 | 9/1973 | France. |
| 954637 | 4/1964 | United Kingdom. |
| 1193190 | 5/1970 | United Kingdom. |
| 1316885 | 5/1973 | United Kingdom. |
| 1537071 | 12/1978 | United Kingdom. |
| 2000237 | 1/1979 | United Kingdom. |
| 2015102 | 9/1979 | United Kingdom. |

Primary Examiner—Paul E. Maslousky
Attorney, Agent, or Firm—Silverman, Cass & Singer, Ltd.

[57] ABSTRACT

A hydraulic booster for a brake system or the like, of a vehicle includes a throttle valve which produces hydraulic pressure corresponding to the depression force applied to a brake pedal. Relative axial displacement of an operating rod and a power piston produces relative rotation of a power piston. The throttle valve is formed between the power piston and the booster body, and responds to the relative rotation of the power piston.

4 Claims, 5 Drawing Figures

HYDRAULIC BOOSTER

BACKGROUND OF THE INVENTION

The present invention relates to a hydraulic booster or hydraulic force multiplying apparatus which may be used for the brake apparatus of a vehicle. More particularly, the present invention relates to a hydraulic booster including a booster body having a stepped bore, an operating rod operated by an input member, e.g. a brake pedal, and slidably arranged in the smaller bore of the booster body, and a power piston slidably arranged in the larger bore of the booster body and defining a boost chamber.

Such a conventional hydraulic booster includes means to throttle hydraulic oil flow, which is supplied to a power steering apparatus, to form on the upstream side of the power piston hydraulic pressure which is used to multiply force. Usually, such a hydraulic booster includes a spool axially and slidably cooperated with the power piston. When the operating rod is operated by the brake pedal to cause relative axial displacement of the power piston, the spool is displaced toward the power piston, and a throttle valve formed between the spool and the power piston operates to throttle the above-mentioned hydraulic oil flow. Hydraulic pressure produced upstream of the throttle valve is introduced in the boost chamber so that the power piston hydraulically follows the operating rod.

In the conventional hydraulic booster, the throttle valve is formed between the spool and the power piston, and its opening is determined by relative axial displacement. To this end, a conical stepped portion is formed on the outer periphery of the spool, while a shoulder portion cooperating with the conical stepped portion is formed on the inner periphery of the power piston. The hydraulic oil flow passage is formed through the throttle valve. When the spool is axially displaced relative to the power piston, the conical stepped portion approaches the shoulder portion to throttle the hydraulic oil flow, and a predetermined hydraulic pressure is produced upstream of the throttle valve.

Such a conventional throttle valve which responds to the relative axial displacement between the two members is limited to being formed between a spool and the power piston. However, by thus forming a spool valve including hydraulic passages in the power piston, the construction of the spool and the power piston becomes very complex and large, so that the hydraulic booster is also very large. The operational characteristics of the throttle valve which is formed between the axially moving spool and the power piston are also limited by the axial relative displacement and axial dimension of the spool and the power piston, so that an accurate, desired throttle effect cannot be expected.

SUMMARY OF THE INVENTION

Accordingly, the object of the present invention is to eliminate the above mentioned disadvantages and to provide an improved hydraulic booster which can be substantially simplified in its construction and which is axially shorter than a conventional hydraulic booster.

Briefly stated, according to the present invention, the throttle valve is not formed between a relatively axial displaceable spool and a power piston. Instead thereof, relative rotation between the operating rod and the power piston is produced by relative axial displacement therebetween. A throttle valve which responds to the relative rotation is formed between the booster body and the rotatable member.

By converting the axial displacement into the relative rotation, and by forming the throttle valve between the stationary booster body and the rotatable member, e.g. the power piston, the valve can be formed simply, and the axial dimention of the power piston can be shortened.

The feature of the present invention will be described in detail referring to accompanying drawings.

DETAILED DESCRIPTION OF AN EMBODIMENT

Figure 1:
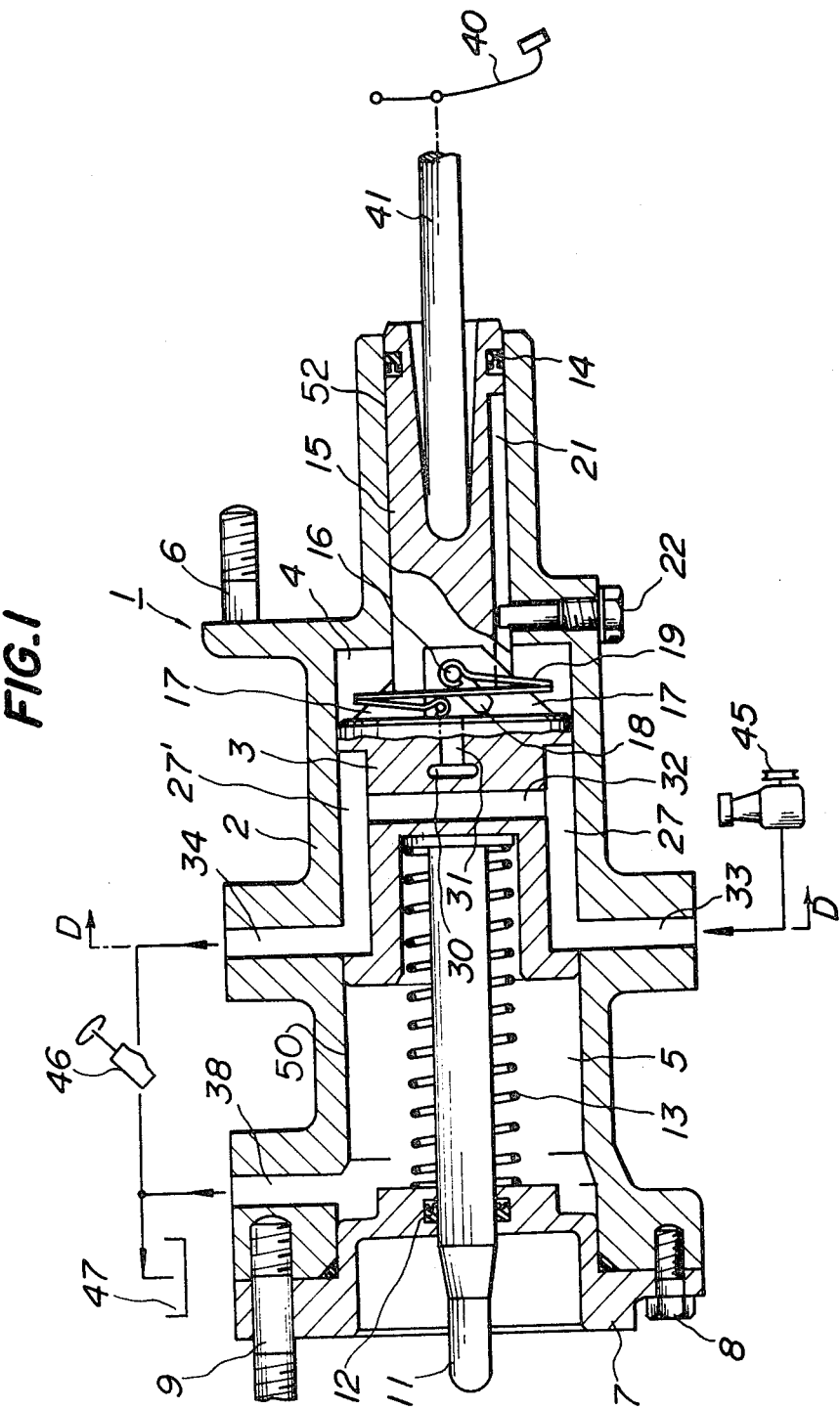
FIG. 1 is a longitudinal-sectional view, taken along line A—A of FIG. 2, of a hydraulic booster according to the present invention.
Figure 2:
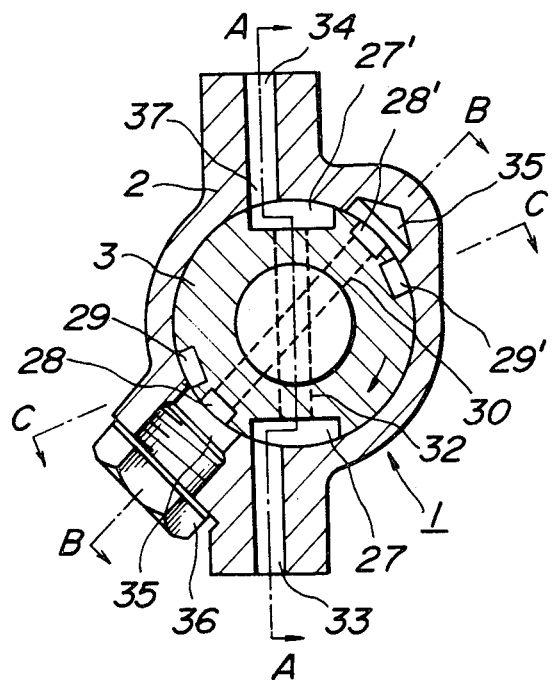
FIG. 2 is a sectional view taken along line D—D of FIG. 1.

Referring to FIGS. 1 and 2, a hydraulic booster 1 is shown according to one preferred embodiment of the present invention. The hydraulic booster 1 has a cylindrical body 2 which includes a large diameter bore portion 50 and a small diameter bore portion 52. A power piston 3 is axially slidably fitted in bore portion 50 to define a boost chamber 4 and a drain chamber 5 on opposite sides of the piston 3. One end surface of the body 2 carries bolts 6 which mount the booster 1 on a vehicle body, and end cover 7 is mounted on the other open end surface of the body 2 by bolts 8. Bolts 9 passing through the cover 7 and threaded into the same end surface of the body 2 serve to mount a brake master cylinder, not shown, on the body 2.

On the end surface of the power piston 3 which opposes the cover 7, an output rod 11 is mounted. The output rod 11 projects through the cover 7 is hydraulically sealed by means of an O-ring, and contacts with a piston of the brake master cylinder. Between the cover 7 and the opposed end surface of the power piston 3, a return spring 13 is arranged so as to elastically urge the power piston to the right end position shown in FIG. 1.

Figure 3:
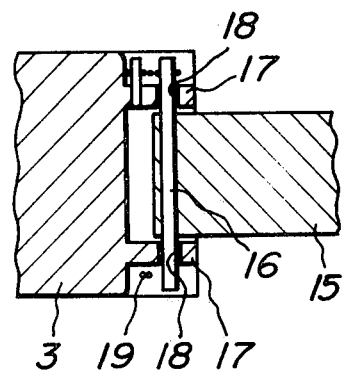
FIG. 3 is a sectional view of a portion of FIG. 1 showing connection between the operating rod and the power piston of the hydraulic booster.

An operating rod 15 is fitted in bore portion 52, slidably passes through the right end portion of the body 2 and is hydraulically sealed by means of a seal ring 14. The left end of the operating rod 15 opposed to the other side surface of the power piston 3 is provided with a radially projecting pin 16. As shown in FIGS. 1 and 3, the side surface of the power piston 3 has two parallel projections 17 and 17. Each projection 17 is formed with an elongate opening 18 and the openings 18 are inclined in directions opposite one another. Each end of the pin 16 is engaged with each elongate opening 18 of the projection 17. A twist coil spring 19 is mounted between, and engaged at both of its ends with the power piston 3 and the operating rod 15 such that the spring 19 urges the pin 16 to end positions of the elongated openings 18 which are the farthest from the operating rod 3. Thus, in the inoperative position shown in FIG. 1, the power piston 3 and the operating rod 15 are maintained in the most spaced apart position along the elongate openings 18. The operating rod 15 has an axially extending groove 21 which is engaged with a pin 22 mounted on the body 2 to prevent the operating rod 15 from rotating. Thus, when the operating rod 15 is pushed toward the power piston 3, the power piston 3 rotates in the direction of the elongate openings 18 and against the force of the twist coil spring 19.

Figure 4:
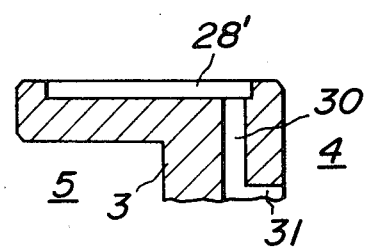
FIG. 4 is a sectional view of a portion of FIG. 2, taken along line B—B of FIG. 2.
Figure 5:
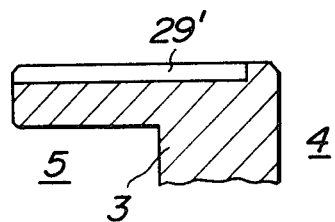
FIG. 5 is a sectional view of a portion of FIG. 2 taken along line C—C of FIG. 2.

The power piston 3 is formed with three pairs of longitudinal grooves 27 and 27', 28 and 28', and 29 and 29', as shown in FIG. 2. The grooves of each pair are arranged in diametrically opposed relationship. The central longitudinal grooves 28 and 28' communicate with one another through a diametrically extending opening 30. Opening 30 communicates with an opening 31 which, in turn, opens to the end surface of the power piston 3 facing the boost chamber 4 as shown in FIG. 4. Also, as shown in FIGS. 1 and 2, the longitudinal grooves 27 and 27', which are on the counterclockwise side of the longitudinal grooves 28 and 28' in FIG. 2, communicate with each other by a diametrically extending opening 32. The longitudinal grooves 29 and 29' extend to the end surface of the power piston 3 which faces the drain chamber 5 as shown in FIG. 5.

The booster body 2 is formed with an inlet port 33, an outlet port 34 and valve openings 35 which communicate with at least a portion of the longitudinal grooves 27 and 27', 28 and 28', and 29 and 29', respectively. The longitudinal groove 27 is formed to be wide enough to communicate with the inlet port 33 when the power piston 3 is rotated between the extreme positions. The valve openings 35 are formed by a blind drill opening formed diametrically in the booster body 2, and the open end thereof is closed by a plug 36. In a normal rotation position in which a brake pedal 40 is not depressed, the valve openings 35 communicate fully with the grooves 28 and 28' and partly with the grooves 29 and 29' as shown in FIG. 2 to thereby provide for communication of the boost chamber 4 with the drain chamber 5. In this instance, the valve openings 35 are not in communication with the grooves 27 and 27'. When a brake pedal 40 is depressed and the power piston 3 is rotated, the valve openings 35 are shut off from the grooves 29 and 29' and communicate with the grooves 27 and 27'. The longitudinal groove 27' communicates with the outlet port 34 in the undepressed position of the brake pedal 40. When the brake pedal 40 is depressed and the power piston 3 is rotated, the longitudinal groove 27' acts as a throttle valve 37 which decreases the communication between the inlet port 33 and the outlet port 34 proportionally according to the rotational displacement of the power piston 3. Thus, hydraulic oil flow supplied from the inlet port 33 is regulated, and the regulated hydraulic pressure produced in the grooves 27 and 27' is supplied through the valve openings 35, longitudinal grooves 28 and 28' and the openings 30 and 31 to the boost chamber 4.

The hydraulic booster 1 described above is connected to a pump 45 by the inlet port 33, to a reservoir 47 through a power steering apparatus 46 by the outlet port 34; to the reservoir 47 by the drain port 38 and with the brake pedal 40 through a push rod 41 and the operating rod 15.

Operation of the hydraulic booster 1 will be described hereinafter. FIGS. 1 to 3 show the inoperative position of the hydraulic booster 1. The boost chamber 4 is in communication with the reservoir 47 through the openings 30 and 31, longitudinal grooves 28 and 28', valve openings 35, longitudinal grooves 29 and 29' and the drain chamber 5. Thus, the power piston 3 is maintained in the extreme right position by the return spring 13 as shown in FIG. 1, and in the inoperative rotative position as shown in FIG. 2 by the twist coil spring 19, such that the elongate openings 18 of the projections 17 engage with the pin 16 of the non-rotated operating rod 15 at their extreme ends. Thus, hydraulic oil from the pump 45 is supplied to the power steering apparatus 46 through the inlet port 33, longitudinal groove 27, opening 32, longitudinal groove 27' and the outlet port 34.

When the brake pedal 40 is depressed, the operating rod 15 is moved leftwardly in FIG. 1, toward the power piston 3. Thus, the pin 16 moves along the elongate openings 18 and 18 against the bias force of the twist coil spring 19, to rotate the power piston 3 clockwise, as shown in FIG. 2 by the arrow. Thus, the throttle valve 37 formed between the outlet port 34 and the longitudinal groove 27' begins to close to generate operating hydraulic pressure in the longitudinal grooves 27 and 27'. The longitudinal grooves 29 and 29' which communicate with the drain chamber 5 are separated from the valve openings 35, and the longitudinal grooves 27 and 27' communicate with the valve openings 35. The operating hydraulic pressure generated in the grooves 27 and 27' flows through the valve openings 35, longitudinal grooves 28 and 28' and the openings 30 and 31 into the boost chamber 4. Consequently, the power piston 3 is moved leftwardly in FIG. 1 against the return spring 13 to follow the movement of the operating rod 15. Thus, the master cylinder, not shown, is operated to actuate brake system, not shown, to brake the vehicle by the hydraulically multiplied force thus generated.

In this instance, the operating hydraulic pressure in the boost chamber 4 also acts on the left end surface of the operating rod 15 to return the operating rod 15. The return force is transmitted through the push rod 41 to the brake pedal 40 to provide an operational reaction force to be fed back to the driver. When the power piston 3 tends to axially move excessively as compared with the displacement of the operating rod 15, the position of the pin 16 along the elongate openings 18 and 18' changes so that the rotative position of the power piston 3 tends to return to the inoperative position shown in FIG. 2. Thus, the throttle valve 37 between the groove 27' and the outlet port 34 opens to reduce the operating hydraulic pressure in the grooves 27 and 27' and in the boost chamber 4. Accordingly, the power piston 3 returns to regulate the position of the pin 16 along the elongate openings 18 and 18 as well as the rotative position of the power piston 3 to produce the regulated operating hydraulic pressure in the boost chamber 4 corresponding to the depression force of the brake pedal 40.

When the brake pedal 40 is released, the power piston 3 rotates counterclockwise in FIG. 2 under the biasing force of the twist coil spring 19, relative to the operating rod 15, such that the pin 16 moves along the elongate openings 18 and 18 to the extreme end position shown in FIGS. 1 and 2. Thus, all the hydraulic oil which is supplied to the inlet port 33 is supplied to the power steering apparatus 46 through the longitudinal groove 27, opening 32, groove 27' and the outlet port 34. Also, hydraulic pressure in the boost chamber 4 is passed through the openings 31 and 30, longitudinal grooves 28 and 28', valve openings 35 and the longitudinal grooves 29 and 29' to the drain chamber 5 which through the drain port 38 with the reservoir 47. Thus, the power piston 3 is urged by the return spring 13 and the braking hydraulic pressure in the master cylinder toward the inoperative position shown in FIG. 1. Consequently, braking action of the vehicle is released.

In the embodiment thus far described, the relative rotation mechanism arranged between the operating rod 15 and the power piston 3 and formed by the pin 16 and the inclined elongate openings 18 is controlled by the twist coil spring 19. In place of the twist coil spring 19, a compression spring may be used which urges the operating rod 15 and the power piston 3 to be spaced from each other. In the embodiment shown, the operating rod is restrained from rotation while the power piston 3 is rotatable relative to the booster body 2. However, the power piston 3 may be prevented from rotation and the throttle valve may be formed between the rotatable operating rod and the booster body.

From the foregoings, it will be appreciated that, since one of the power piston and the operating rod is rotatable with respect to the other corresponding to the relative axial displacement therebetween, and since the throttle valve is formed between the rotatable member and the booster body to operate corresponding to their relative rotation, the hydraulic booster according to the present invention does not require a specific valve spool to form the throttle valve. Consequently, the hydraulic booster can be simplified. Also, as the throttle valve is formed between relatively rotatable members, the axial dimension of the power piston can be substantially decreased compared with the conventional power piston, and the hydraulic booster can be made compact.

What is claimed is:

1. A hydraulic booster comprising a booster body having therein a stepped bore, an operating rod operated by an input member and slidably arranged in a first bore portion formed in said booster body, a power piston slidably arranged in a second bore portion formed in said booster body and defining a boost chamber, a rotating mechanism including elongate slots formed on one of the operating rod and the power piston, and a pin engaged in the slots and provided on the other of the operating rod and the power piston to produce relative rotation between the operating rod and the power piston corresponding to relative axial displacement therebetween, means to maintain the operating rod and the power piston in one of their extreme relative rotational positions, means to rotatively fix one of the operating rod and the power piston relative to the booster body, the other one of the operating rod and the power piston being a rotatable member, a throttle valve formed between the booster body and said rotatable member, said rotatable member being rotatable with respect to the booster body and, the throttle being operated in response to the rotation of said rotatable member, whereby when the input member is actuated to cause the rotation of said rotatable member relative to the booster body, the throttle valve is actuated to throttle hydraulic oil flow supplied thereto to produce upstream of the throttle valve a hydraulic pressure which is introduced into the boost chamber to hydraulically displace the power piston following the operating rod.

2. A hydraulic booster comprising a booster body (2), an operating rod (15) operated by an input member (41) and slidably arranged in a first bore portion (52) formed in said booster body (2), a power piston (3) slidably arranged in a second bore portion of greater diameter than said first bore portion, each of said bore portions being formed integrally by said booster body (2) and defining a boost chamber (4), and a throttle valve (37) having an opening which is determined by a relative axial movement between the operating rod (15) and the power piston (3) whereby when the input member (41) is actuated, said throttle valve (37) is actuated to throttle hydraulic oil flow supplied thereto to reduce the opening and produce upstream of the throttle valve (37) a hydraulic pressure which is introduced into the boost chamber (4) to hydraulically displace the power piston (3) following the operating rod (15), wherein the booster further comprises:
 a rotating mechanism (16, 18) producing relative rotation between the operating rod (15) and the power piston (3) corresponding to relative axial displacement therebetween;
 means (19) to maintain the operating rod and the power piston in respective one of their extreme rotational positions;
 means (21, 22) to keep one (15 or 3) of the operating rod and the power piston from rotation with respect to the booster body (2);
 the other (3 or 15) of the operating rod and the power piston being a member rotatable with respect to the booster body;
 said throttle valve (37) having a valve element formed by said rotatable member (3 or 15), and said opening between the booster body and the valve element (3 or 15), said opening being reduced or increased in response to the rotation of said valve element with respect to the booster body.

3. An apparatus as claimed in claim 1 or 2, wherein said means to maintain the operating rod and the power piston in one of their extreme relative rotational positions comprises a twist coil spring, which is mounted between, and engaged with the operating rod and the power piston.

4. An apparatus as claimed in claim 1 or 2, wherein said rotatable member is the power piston.

* * * * *